E. C. MARULLI.
VALVE.
APPLICATION FILED OCT. 3, 1919.
1,337,462. Patented Apr. 20, 1920.
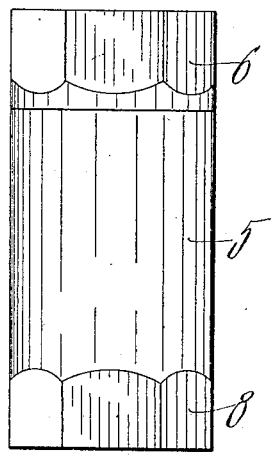
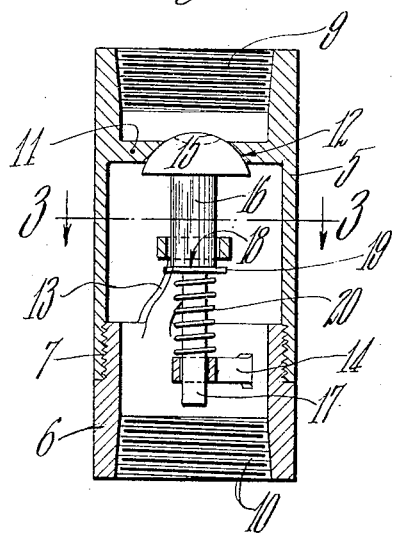
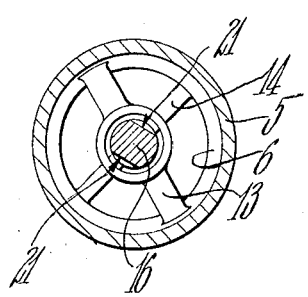
INVENTOR
Ernesto C. Marulli.
BY Chapin & Neal
ATTORNEYS.

UNITED STATES PATENT OFFICE.

ERNESTO C. MARULLI, OF HOLYOKE, MASSACHUSETTS.

VALVE.

1,337,462.    Specification of Letters Patent.    Patented Apr. 20, 1920.

Application filed October 2, 1919. Serial No. 328,201.

*To all whom it may concern:*

Be it known that I, ERNESTO C. MARULLI, a subject of the King of Italy, and now residing at Holyoke, in the county of Hampden and State of Massachusetts, United States of America, have invented certain new and useful Improvements in Valves, of which the following is a specification.

This invention relates to improvements in valves and, more particularly, to valves of the so-called puppet type which are adaptable for use as check valves, relief valves, and so forth.

An object of the invention is to provide a valve, of the type described, which may be readily taken apart to obtain access to the valve disk and seat, so that they may be conveniently cleaned or ground.

Another object of the invention is to provide a valve, of the type described, wherein the casing is made in two parts, suitably connected for convenient removal, and one part carrying the valve, its stem, spring and guides, and the other the valve seat.

Another object of the invention is to provide, in a valve of the two-part casing type, as described, a spring-pressed valve, which is so constructed and mounted that it automatically alines accurately with its seat even though the two casing members may be slightly out of alinement.

A further object of the invention is to provide a valve of generally improved construction.

Other objects and advantages will appear in the following description and in the illustrative embodiment of the invention in the accompanying drawings, in which—

Figure 1 is an exterior elevational view of the valve;

Fig. 2 is a sectional elevational view thereof; and

Fig. 3 is a sectional plan view taken on the line 3—3 of Fig. 2.

Referring to these drawings; the valve casing comprises two parts 5 and 6, which are removably secured together in axial alinement, as by the screw thread connection 7. Each casing part is of generally hollow cylindrical form and the exterior of the casing is of uniform diameter from end to end to present a smooth unbroken exterior, save for its ends which are formed into polygonal shape, as at 8, to receive a wrench. The valve casing is characterized in that it is little, if any, greater diameter than a standard pipe coupling and thus occupies a minimum of space and presents a neat exterior appearance.

The casing member 5 is tapped, as at 9, at one end to receive an inlet pipe and the opposite end of the member 6 is likewise tapped, as at 10, to receive an outlet pipe. The member 5 is provided, intermediate its ends, with a partition wall 11, which, in turn, is provided with a centrally located conical opening, the tapered wall 12 of which forms a valve seat. The valve, its spring and its guides, are, however, all carried by the member 6, such member having two integral and axially spaced bridges 13 and 14, which function as guides.

The valve, indicated at 15, is preferably substantially hemi-spherical and has fixed thereto a stem 16 which is loosely received in an opening formed in the bridge 13. The stem 16 is shouldered down, having a portion 17 of reduced diameter and a shoulder 18. The reduced portion 17 is loosely received in an opening in the bridge 14, but fits such opening more closely than the portion 16 fits its opening in bridge 13. A washer 19, of greater diameter than the stem 16, is loosely applied to the reduced portion 17 and is normally held against shoulder 18 by a spring 20, which is coiled about the portion 17 and acts between the washer and the bridge 14. The spring 20 thus acts to yieldingly force the valve 15 against its seat 12, but, when the casings 5 and 6 are taken apart, the movement of the valve 15 under the force of spring 20 is limited by the engagement of the washer 19 with bridge 13, whereby the valve is not allowed to shoot out of its guides.

The stem 16 is preferably slabbed off, as at 21, to receive the socket of a wrench or valve grinding tool, whereby the valve 15 may readily be ground to its seat 12, when desired.

The loose connection of the valve stem 16 and the integral reduced portion 17 with their respective guides permits the axis of the valve to tilt slightly from the axis of the casings and valve seat. This is considered important and advantageous in a valve of this type, where the casing is made in two parts which are connected with one another by screw threads. By reason of such threaded connection, the axis of one casing may not aline exactly with that of the other and the valve stem, if closely held in the guides on one casing, will not aline with the seat in the other casing. The described construction allows a limited variation in alinement of the axis of the valve and the casing 6, in which it is mounted, and allows the valve to find its own alinement with and closely fit its seat.

The two-piece casing construction, with the seat on one and the valve parts on the other, is important inasmuch as the valve may be readily taken apart and conveniently cleaned, when desired.

The invention has been disclosed herein, in an embodiment at present preferred, for illustrative purposes, but the scope of the invention is defined by the appended claims rather than by the foregoing description.

What I claim is—

1. A valve, comprising, two casing members removably secured together in axial alinement, a valve seat provided in one of said members, valve stem guides all provided in the other member, a valve to engage said seat and having its stem mounted in said guides, and means to yieldingly hold the valve to its seat.

2. A valve, comprising, a casing made up of two members only, such members being substantially cylindrical and being screwed together in axial alinement, a valve seat provided in one of said members, a plurality of valve stem guides all provided in the other member, a valve to engage said seat and having its stem mounted in said guides, and means to yieldingly hold the valve to its seat.

3. A valve, comprising, two casing members removably secured together in axial alinement, a valve seat provided in one of said members, at least two valve stem guides both provided in the other member, a valve to engage said seat and having its stem so mounted in said guides that it is free to tilt to a limited extent with relation to the axis of the member in which it is mounted, and means to yieldingly hold the valve to its seat.

4. A valve, comprising, a hollow casing having a valve seat and two transverse bridges arranged in axially spaced relation therein, a valve slidably mounted in said bridges and having a shoulder intermediate its ends and intermediate said bridges, a washer loosely fitting said stem, and a spring acting between one of said bridges and said washer to yieldingly hold the valve to its seat, said washer being of sufficient diameter to engage the other bridge and limit the movement of the valve.

ERNESTO C. MARULLI.